(12) United States Patent
Jiang

(10) Patent No.: US 12,710,308 B2
(45) Date of Patent: Aug. 18, 2026

(54) TRANSDUCER AND ULTRASONIC PROBE HAVING THE SAME

(71) Applicant: Qisda Corporation, Taoyuan City (TW)

(72) Inventor: Fu-Sheng Jiang, Taoyuan City (TW)

(73) Assignee: QISDA CORPORATION, Taoyuan City (TW)

( * ) Notice: Subject to any disclaimer, the term of this patent is extended or adjusted under 35 U.S.C. 154(b) by 318 days.

(21) Appl. No.: 18/367,526

(22) Filed: Sep. 13, 2023

(65) Prior Publication Data

US 2024/0118130 A1 Apr. 11, 2024

(30) Foreign Application Priority Data

Oct. 11, 2022 (TW) ................................. 111138421

(51) Int. Cl.
*G01H 11/08* (2006.01)
*B06B 1/06* (2006.01)
*G10K 11/30* (2006.01)

(52) U.S. Cl.
CPC ............ *G01H 11/08* (2013.01); *B06B 1/0622* (2013.01); *B06B 1/067* (2013.01); *G10K 11/30* (2013.01)

(58) Field of Classification Search
CPC ....... G01H 11/08; B06B 1/067; B06B 1/0622; G10K 11/30
USPC ........................................................... 73/661
See application file for complete search history.

(56) References Cited

U.S. PATENT DOCUMENTS

| | | | | |
|---|---|---|---|---|
| 7,710,001 | B2 | 5/2010 | Morris et al. | |
| 9,808,830 | B2 | 11/2017 | Tai et al. | |
| 2018/0161006 | A1* | 6/2018 | Si | A61B 8/4444 |
| 2019/0216428 | A1* | 7/2019 | Gu | A61B 8/4422 |
| 2020/0346044 | A1* | 11/2020 | Woodacre | B06B 1/067 |

FOREIGN PATENT DOCUMENTS

| | | | |
|---|---|---|---|
| CN | 112214926 | A | 1/2021 |
| EP | 0031614 | B2 | 7/1990 |

OTHER PUBLICATIONS

Office action of counterpart application by Taiwan IP Office on Mar. 25, 2023.

* cited by examiner

*Primary Examiner* — Peter J Macchiarolo
*Assistant Examiner* — John M Royston

(57) ABSTRACT

The present disclosure provides a transducer for generating ultrasonic waves to detect an object and an ultrasonic probe using the same. The transducer includes a piezoelectric layer. The piezoelectric layer has a first surface and a second surface opposite to the first surface. The first surface is farther from the object than the second surface and includes a curved structure protruded along a first direction away from the object. The ultrasonic probe includes a handle component and a transducer. The transducer is arranged at one end of the handle component.

16 Claims, 4 Drawing Sheets

TRANSDUCER AND ULTRASONIC PROBE HAVING THE SAME

This application claims the benefit of Taiwan application Serial No. 111138421, filed Oct. 11, 2022, the subject matter of which is incorporated herein by reference.

BACKGROUND OF THE INVENTION

Field of the Invention

The invention relates in general to a transducer and an ultrasonic probe having the same.

Description of the Related Art

Ultrasonic transducers basically can be divided into magneto strictive transducers, piezoelectric ultrasonic transducers, micromachined ultrasonic transducers and interdigital transducers. The piezoelectric transducer has been widely used as an acoustic-electric conversion element. However, the conventional piezoelectric transducer still has room for improvement in ring-down performance. Therefore, it has become a prominent task for the industry to improve the structure of an ultrasonic transducer and enhance the ring-down performance of the ultrasonic transducer.

SUMMARY OF THE INVENTION

According to a first aspect of the present invention, a transducer for generating ultrasonic waves to detect an object is provided. The transducer includes a piezoelectric layer. The piezoelectric layer has a first surface and a second surface opposite to the first surface. The first surface is farther from the object than the second surface and includes a curved structure protruded along a first direction away from the object. The ultrasonic probe includes a handle component and a transducer. The transducer is arranged at one end of the handle component.

According to another aspect of the present invention, an ultrasonic probe for detecting an object is provided. The ultrasonic probe includes a handle component and a transducer according to the first aspect of the present invention. The transducer is arranged at one end of the handle component.

The above and other aspects of the invention will become better understood with regard to the following detailed description of the preferred but non-limiting embodiment(s). The following description is made with reference to the accompanying drawings.

DETAILED DESCRIPTION OF THE INVENTION

Figure 1:
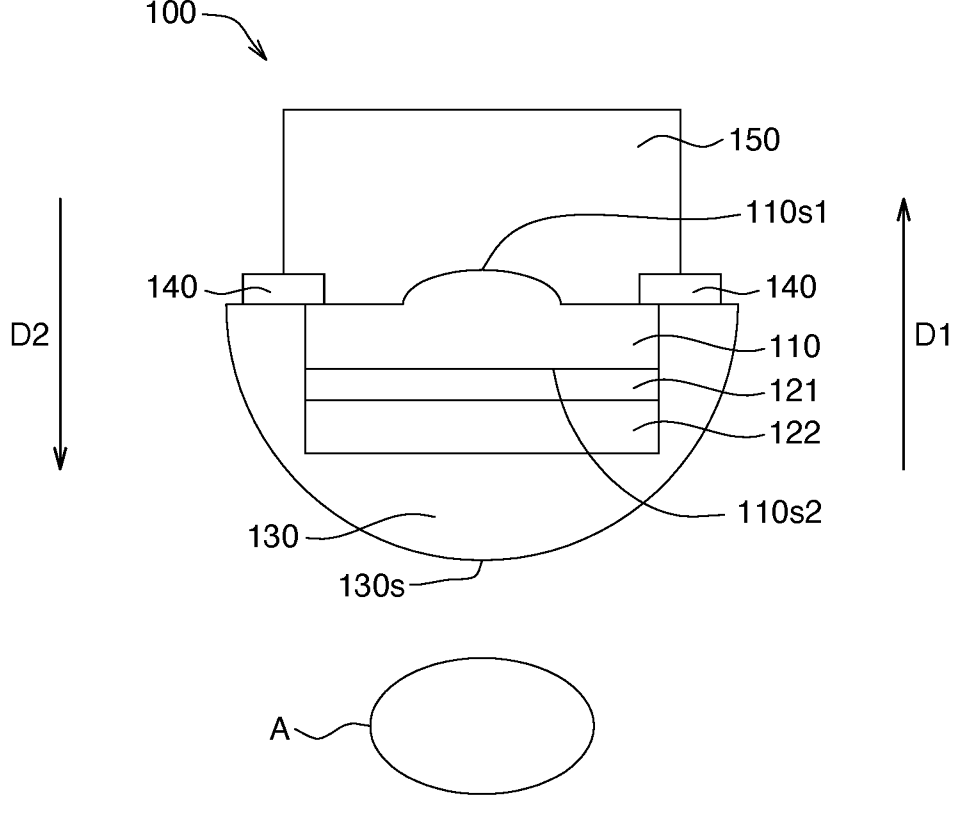
FIG. 1 is a structural diagram of a transducer according to an embodiment of the present invention.
Figure 2:
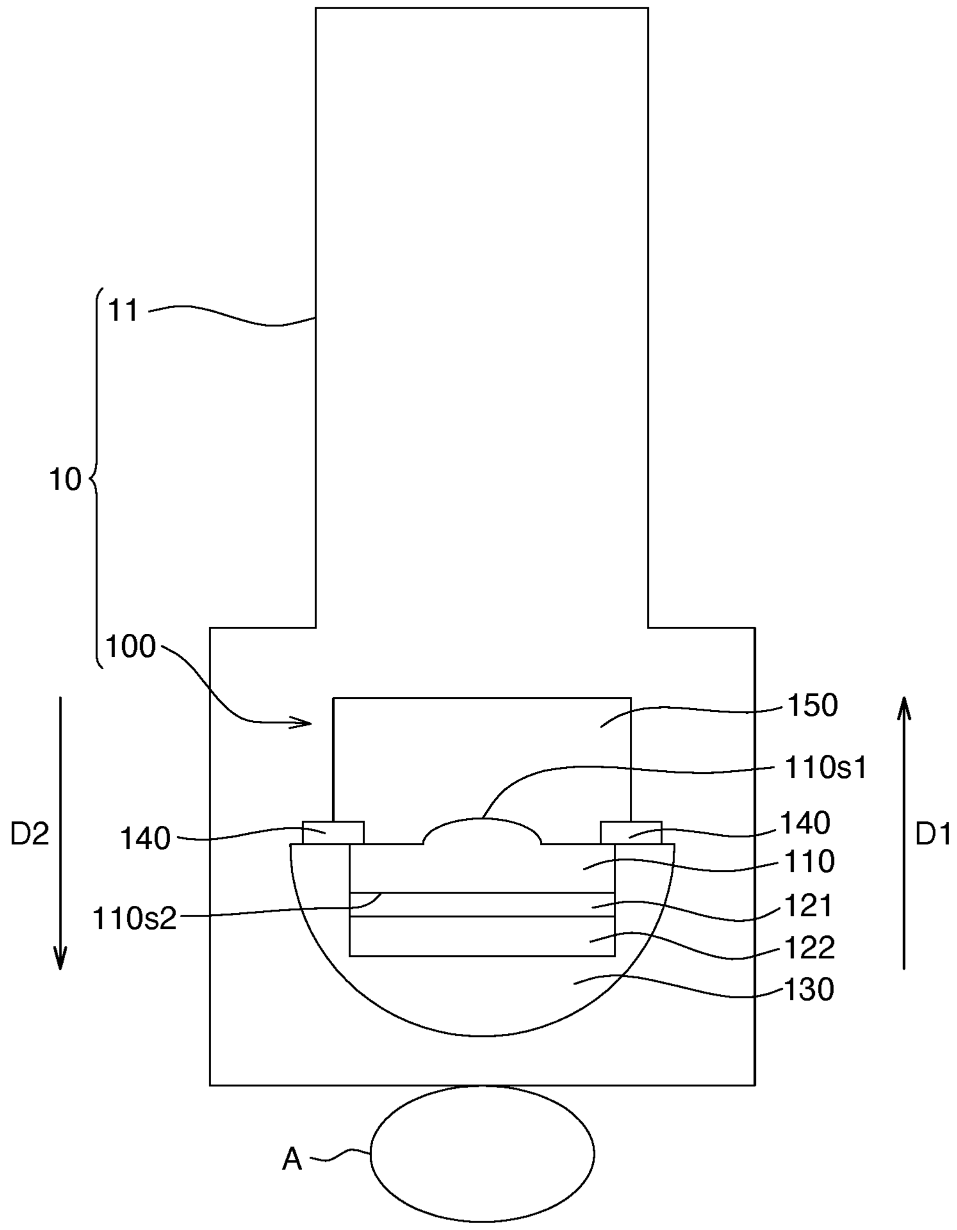
FIG. 2 is a structural diagram of an ultrasonic probe according to an embodiment of the present invention.
Figure 3:
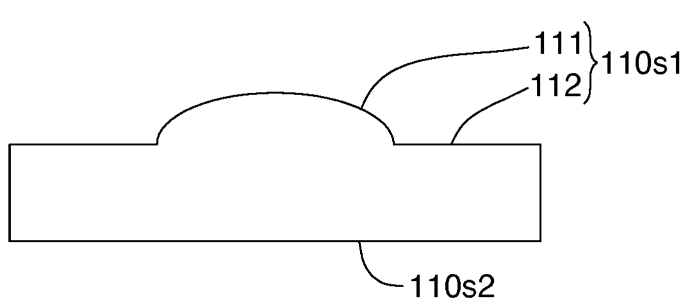
FIG. 3 is a schematic diagram of a piezoelectric layer of a transducer according to an embodiment of the present invention.

Refer to FIG. 1, FIG. 2 and FIG. 3. FIG. 1 is a structural diagram of a transducer 100 according to an embodiment of the present invention. FIG. 2 is a structural diagram of an ultrasonic probe 10 according to an embodiment of the present invention. FIG. 3 is a schematic diagram of a piezoelectric layer 110 of the transducer 100 according to an embodiment of the present invention.

As indicated in FIG. 1, the transducer 100 can be realized by such as an ultrasonic transducer for generating ultrasonic waves to detect an object A. The transducer 100 includes the piezoelectric layer 110, that is, the transducer 100 is a piezoelectric ultrasonic transducer. For instance, the piezoelectric layer 110 may be formed of a material such as lead zirconate titanate (PZT), lead magnesium niobate-lead titanate (PMN-PT) or lithium niobate ($LiNbO_3$).

As indicated in FIG. 2, the ultrasonic probe 10 includes a handle component 11 and the transducer 100. The transducer 100 may be arranged at one end of the handle component 11 to enable the ultrasonic probe 10 to detect the object A. The object A is an object, such as human skin, which allows ultrasonic waves to pass through. The ultrasonic probe 10 is configured to contact human skin to perform detection.

As indicated in FIG. 1 and FIG. 3, the piezoelectric layer 110 has a first surface **110*s*1 and a second surface 110*s*2 opposite to the first surface 110*s*1. The first surface 110*s*1 includes a curved structure 111. In an embodiment, the piezoelectric layer 110 is formed by the arrangement of several piezoelectric elements, and at least a part of the piezoelectric elements have different thicknesses to form the curved structure 111. In another embodiment, the piezoelectric layer 110 may be formed by the arrangement of several piezoelectric elements having identical thickness. The piezoelectric elements are processed with curved surface machining to form the curved structure 111**.

Besides, the first surface **110*s*1 further includes a flat structure 112 formed outside the curved structure 111. However, the present invention is not limited thereto. In an embodiment, the first surface 110*s*1 may be a complete curved surface. That is, the first surface 110*s*1 as a whole forms the curved structure 111** and does not include a flat structure.

As indicated in FIG. 1 and FIG. 2, the transducer 100 further includes a first matching layer 121 and a second matching layer 122, wherein the first matching layer 121 may be arranged on the second surface **110*s*2 of the piezoelectric layer 110. The second matching layer 122 may be arranged on the first matching layer 121, so that the first matching layer 121 is interposed between the piezoelectric layer 110 and the second matching layer 122. The first matching layer 121 and the second matching layer 122 enable the acoustic impedance of the piezoelectric layer 110 to match the acoustic impedance of the ambient medium of the ultrasonic waves generated by the transducer 100. In terms of materials, the first matching layer 121 may be formed of a composite material such as a mixture of metal powders and epoxy, and the second matching layer 122** may be formed of epoxy.

Additionally, the transducer 100 further includes a lens element 130 arranged on the peripheral of the piezoelectric layer 110. The lens element 130 has a lens curved surface **130*s* protruded along a second direction towards the second direction D2 of the object A, wherein the second direction D2 and the first direction D1 are inverse to each other. The lens element 130 may be attached to the two sides of the first matching layer 121 and the second matching layer 122, so that the first matching layer 121 and the second matching layer 122 are interposed between the piezoelectric layer 110 and the lens element 130. The lens element 130 is configured to enhance the focusing performance of the ultrasonic waves generated by the transducer 100. For instance, the lens element 130** may be formed of a silicone material or a glass material.

As indicated in FIG. 1 and FIG. 2, the transducer 100 further includes a flexible circuit board 140. The flexible circuit board 140 and the piezoelectric layer 110 are connected via the first surface 110_s_1. The piezoelectric layer 110 can transmit signals through the flexible circuit board 140. In an embodiment, the flexible circuit board 140 may be configured as a non-display configuration but the embodiment is not limited to. For instance, the flexible circuit board 140 may be implemented by a transparent circuit board. In another embodiment, the flexible circuit board 140 may be replaced by a configuration of wire bonding. Furthermore, the configuration of wire bonding may be realized by wedge bonding. In addition, the flexible circuit board 140 also may be implemented replaced by a general circuit board, which is electrically connected to the piezoelectric layer 110 via the first surface 110_s_1.

Moreover, the transducer 100 further includes an adhesive layer 150. The adhesive layer 150 is arranged on the first surface 110_s_1 and covers the curved structure 111. Alternatively, the adhesive layer 150 can partly contact the flexible circuit board 140 to cover a part of the flexible circuit board 140. The adhesive layer 150 is configured to absorb the ultrasonic waves transmitted towards the first direction D1 and quickly resume the stationery state of the piezoelectric layer 110 to reduce reverberation lest the interpretation of signals might be affected. For instance, the adhesive layer 150 is formed of a material with strong attenuation characteristics, so that the ultrasonic waves transmitted towards the back side of the transducer 100 may be completely absorbed, and the sound field transmitted towards the front side of the transducer 100 along the second direction D2 will not be affected.

Figure 4:
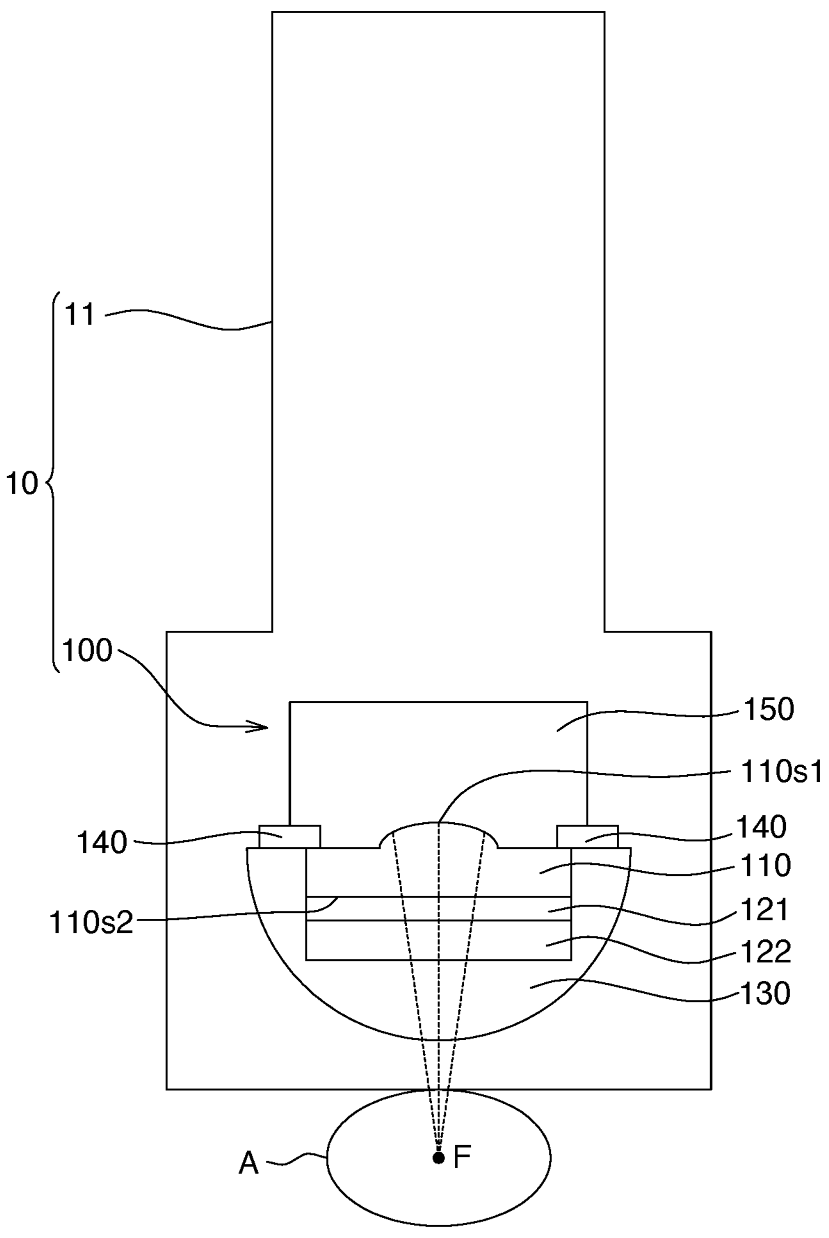
FIG. 4 is a structural diagram of an ultrasonic probe according to an embodiment of the present invention.

FIG. 4 is a schematic diagram of the ultrasonic probe 10. FIG. 4 illustrates the transducer 100 of the ultrasonic probe 10 performing the focusing of ultrasonic waves. The piezoelectric layer 110 of the transducer 100 includes a curved structure 111 whose curvature is configured to be corresponding to a focal position F of the transducer 100 or the ultrasonic probe 10, so that the sound wave converted from electrical energy by the transducer 100 may be accurately focused on the object A. Furthermore, the design of the curved structure 111 of the piezoelectric layer 110 make the transmission time of sound wave from the middle part of the piezoelectric layer 110 approximate equal to that from the peripheral part of the piezoelectric layer 110, hence improving the accuracy of focusing. In an embodiment, the focal range of the transducer 100 is about 55 mm to 60 mm.

In comparison to a conventional transducer, the transducer and the ultrasonic probe using the same disclosed in above embodiments of the present invention has a curved structure formed on the piezoelectric layer opposite to the main detecting direction of ultrasonic waves, making the transmission time of sound wave from the middle part of the piezoelectric layer approximate equal to that from the peripheral part of the piezoelectric layer, hence producing more accurate focusing than the convention transducer. In comparison to a conventional transducer, the transducer disclosed in above embodiments of the present invention reduces the ring-down by about 40% and makes the ring-down time shorter.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A transducer for generating ultrasonic waves to detect an object, wherein the transducer comprises:

a piezoelectric layer having a first surface and a second surface opposite to the first surface, wherein the first surface is farther from the object than the second surface and comprises a curved structure protruded along a first direction away from the object, the first surface further has a flat structure formed outside the curved structure, and the flat structure and the curved structure are connected to each other to co-form the first surface of the piezoelectric layer.

2. The transducer according to claim 1, further comprising a first matching layer arranged on the second surface.

3. The transducer according to claim 1, further comprising a lens element, wherein the lens element is arranged on a peripheral of the piezoelectric layer and has a lens curved surface protruded along a second direction towards the object.

4. The transducer according to claim 3, wherein the lens element is formed of a silicone material or a glass material.

5. The transducer according to claim 1, further comprising a flexible circuit board, wherein the flexible circuit board and the piezoelectric layer are connected via the first surface.

6. The transducer according to claim 1, further comprising an adhesive layer, wherein the adhesive layer is arranged on the first surface and covers the curved structure.

7. The transducer according to claim 1, wherein the piezoelectric layer is formed through the arrangement of a plurality of piezoelectric elements and at least a part of the piezoelectric elements have different thicknesses to form the curved structure.

8. The transducer according to claim 1, wherein a curvature of the curved structure is configured to be corresponding to a focal position of the transducer.

9. An ultrasonic probe for detecting an object, wherein the ultrasonic probe comprises:

a handle component; and a transducer arranged at one end of the handle component, wherein the transducer comprises:

a piezoelectric layer having a first surface and a second surface opposite to the first surface, wherein the first surface is farther from the object than the second surface and comprises a curved structure protruded along a first direction away from the object, the first surface further has a flat structure formed outside the curved structure, and the flat structure and the curved structure are connected to each other to co-form the first surface of the piezoelectric layer.

10. The ultrasonic probe according to claim 9, wherein the transducer further comprises a first matching layer arranged on the second surface.

11. The ultrasonic probe according to claim 9, wherein the transducer further comprises a lens element, which is arranged on the peripheral of the piezoelectric layer and has a lens curved surface protruded along a second direction towards the object.

12. The ultrasonic probe according to claim 11, wherein the lens element is formed of a silicone material or a glass material.

13. The ultrasonic probe according to claim 9, wherein the transducer further comprises a flexible circuit board, the flexible circuit board and the piezoelectric layer are connected via the first surface.

14. The ultrasonic probe according to claim 9, wherein the transducer further comprises an adhesive layer, which is arranged on the first surface and covers the curved structure.

15. The ultrasonic probe according to claim 9, wherein the piezoelectric layer is formed by an arrangement of a plurality of piezoelectric elements, and at least a part of the piezoelectric elements have different thicknesses to form the curved structure.

16. The ultrasonic probe according to claim 9, wherein a curvature of the curved structure is configured to be corresponding to a focal position of the transducer.

* * * * *